No. 673,084. Patented Apr. 30, 1901.
J. McCAULEY.
AXLE.
(Application filed Jan. 22, 1900.)
(No Model.)
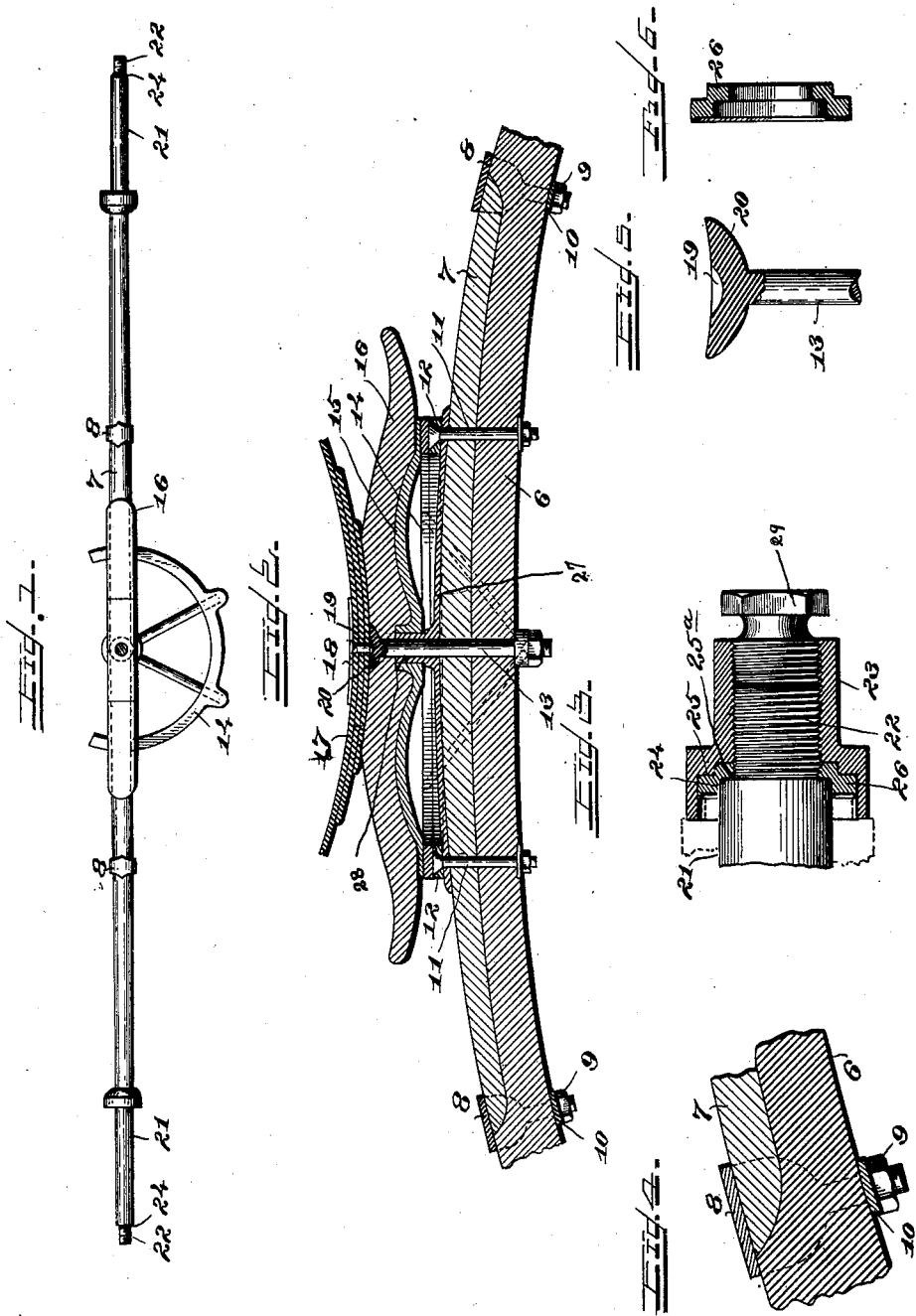
Witnesses
Inventor
James McCauley,

UNITED STATES PATENT OFFICE.

JAMES McCAULEY, OF CHICAGO, ILLINOIS, ASSIGNOR TO THE STAVER CARRIAGE COMPANY, OF SAME PLACE.

AXLE.

SPECIFICATION forming part of Letters Patent No. 673,084, dated April 30, 1901.

Application filed January 22, 1900. Serial No. 2,356. (No model.)

*To all whom it may concern:*

Be it known that I, JAMES McCAULEY, a citizen of the United States, residing at Chicago, in the county of Cook and State of Illinois, have invented certain new and useful Improvements in Axles, of which the following is a specification, reference being had to the accompanying drawings.

My invention relates to axles for carriages, buggies, and other vehicles, and has for its object to provide certain improvements in the axle proper, in the axle-spindles, and in the devices for securing the axle in position.

It consists in the various improvements hereinafter described, and particularly pointed out in the claims.

In the accompanying drawings, Figure 1 is a plan view of my improved axle, illustrating the head-block and the upper circle. Fig. 2 is a longitudinal vertical section of the central part of the axle and the superimposed devices. Fig. 3 is a sectional view illustrating the end of the axle-spindle and the nut which fits thereon. Fig. 4 is an enlarged longitudinal section of a part of the axle. Fig. 5 is a view of the king-bolt, the upper end thereof being in section; and Fig. 6 is a view of one of the washers.

Referring to the drawings, 6 indicates the axle, which is constructed of steel and is provided with a wooden strip or axle-cap 7, fitted into the upper central portion of the axle and extending about a third of the length thereof, as illustrated in Figs. 1 and 2. From an inspection of Fig. 2 it will be noted that the metal portion of the axle is countersunk or cut away to receive the axle-cap 7, which lies flush with the surface of the axle at the ends of said cap. The intermediate portion of the axle-cap by this construction forms, with the end portions of the axle, a true symmetrical arch and does not disturb the symmetry of the lines of the axle, as would be the case if the axle were not cut away to receive the axle-cap. The axle-cap 7 is cemented in place and is further secured by clips 8, arranged at its ends and overlapping the adjacent metal portion of the axle, as shown in Fig. 2. Nuts 9 and cross-bars 10 are provided below the axle to secure the clips 8 in place. The axle-cap 7 is further secured in place by bolts 11, which secure the lower circle 12 upon the axle and pass through the axle-cap and the axle 6, as shown in Fig. 2. The king-bolt 13 also passes through the axle-cap 7 and the axle 6.

By providing a wooden axle-cap 7 in connection with a metallic axle, as above described, I secure a construction which is more efficient than anything which has heretofore been produced, as the wooden axle-cap not only makes the axle considerably lighter than it would otherwise be, but it also provides an improved means for the attachment of the circle to the axle. Furthermore, the manner of fitting the axle-cap to the axle preserves the symmetry of the axle, as already stated.

14 indicates the upper circle, 15 the perchplate, and 16 the head-block, all of which may be of any desired construction.

27 indicates a plate which is secured on the upper side of the axle-cap 7 and is provided with a sleeve 28, rising centrally therefrom, said sleeve being placed at the center of the axle, the king-bolt 13 passing through it, as shown in Fig. 2. The perch-plate 15 and head-block 16 are fitted upon said sleeve 28, as shown. By this construction sleeve 28 receives the strain which would otherwise be received by the king-bolt, thus minimizing the danger of wrenching or breaking the king-bolt.

17 indicates the springs, which are secured, as usual, upon the head-block 16.

18 indicates a bolt which secures the parts of the spring together, as shown in Fig. 2. The head of the bolt 18, as illustrated in Fig. 2, projects below the bottom of the spring 17, and to provide a proper bearing for the spring, so that it may fit snugly upon the head-block 16, the king-bolt 13 is provided with a recess 19 in its head 20, as shown in Fig. 5. By this arrangement the king-bolt does not interfere with the spring in any way, but, on the contrary, assists in holding it in position.

21 indicates the axle-spindles. The spindles 21 are provided with screw-threaded ends 22, adapted to receive nuts 23 to hold the wheels in place. Adjacent to the screw-threaded ends 22 the spindles 21 are turned down, as shown in Fig. 3, forming shoulders 24, and the nuts 23 are also provided with shoulders 25$^a$ opposite the shoulders 24. As shown in Fig. 3, the diameter of the nut 23 at the shoulder 25 is greater than that of the spindle at the shoulder 24, and the internal diameter of the nut 23 at the shoulder 25ª is less than the external diameter of said spindle. Between the shoulders 24 25 is a washer 26, preferably of leather, the external diameter of which is substantially equal to the internal diameter of that part of the nut 23 that extends over the spindle 21. By this construction when the nut 23 is screwed upon the end 22 of the spindle the washer 26 is pressed inward by the shoulder 24 of the spindle until it extends below the shoulder 25 of the nut, as shown in Fig. 3, thus pressing the washer into the shape shown in Fig. 6. The washer is thereby folded over the shoulder 24 of the spindle and effectually prevents the escape of the lubricator, as well as the admission of dust. The outer portion of the washer projects above the spindle, as shown in Fig. 3, in position to engage the outer end of the axle-box, (indicated in dotted lines.) The nut 23 is provided with an adjacent bolt 29 at its outer end, so that it may be readily adjusted to take up wear, thereby maintaining a close contact between the washer 26 and the end of the spindle, as well as the end of the axle-box.

That which I claim as my invention, and desire to secure by Letters Patent, is—

1. The combination of an axle-spindle having a shoulder, a nut, and an elastic washer interposed between the shoulder and nut and having its outer portion projecting beyond the surface of the spindle and its inner portion extending inward beyond the shoulder, substantially as described.

2. The combination with an axle, of a king-bolt having a recess 19 in the upper end thereof, and springs secured above said king-bolt, said springs having a bolt 18 the head of which enters said recess 19, substantially as described.

3. The combination of an axle-spindle having a shoulder 24, a nut 23 having shoulders 25, 25ª, and an elastic washer interposed between said shoulders 24, 25 and 25ª, its outer portion projecting beyond the surface of the spindle, its inner portion extending inward beyond the shoulders 24, and 25, substantially as described.

4. The combination of an axle-spindle having a shoulder 24 and a screw-threaded portion, a nut adapted to screw upon said screw-threaded portion of the spindle and having a shoulder 25, the diameter of the nut at the shoulder 25 being greater than that of the spindle at the shoulders 25, 25ª, and an elastic washer of greater external diameter than the nut at the shoulder 25, substantially as described.

5. The combination of an axle, a plate secured thereon having a vertically-disposed sleeve formed integral therewith, a lower circle secured on said plate, an upper circle resting on said lower circle, a perch-plate and head-block secured to said upper circle and fitted over said sleeve, and a king-bolt passing through said sleeve and into said head-block, substantially as described.

6. The combination with an axle-spindle having a plurality of shoulders, the internal diameter of the nut at one of said shoulders being less than the external diameter of said spindle and the external diameter of said nut at the other shoulder being greater than the external diameter of said spindle, and a washer interposed between the shoulders of the nut and spindle.

JAMES McCAULEY.

Witnesses:
ALBERT H. ADAMS,
C. E. PICKARD.